Jan. 12, 1943.　　　P. LANDROCK　　　2,308,086
SHEET CUTTING APPARATUS
Filed Feb. 16, 1942　　　7 Sheets-Sheet 1

INVENTOR
Paul Landrock
BY
Cumpston & Shepard
his ATTORNEYS

Patented Jan. 12, 1943

2,308,086

UNITED STATES PATENT OFFICE 2,308,086

SHEET CUTTING APPARATUS

Paul Landrock, Rochester, N. Y., assignor to Photostat Corporation, Providence, R. I., a corporation of Rhode Island Application February 16, 1942, Serial No. 431,093

15 Claims. (Cl. 164—48)

This invention relates to apparatus for cutting sheets, and particularly for cutting paper and card stock.

An object of the invention is the provision, in such sheet cutting apparatus, of improved means for counteracting or overcoming any tendency of the sheet to curl in an undesirable manner.

One form of sheet cutting apparatus of a character to which the present invention is applicable is disclosed in United States Patent 2,126,478, granted August 9, 1938, for a joint invention of Paul Landrock (the present applicant) and Arthur W. Caps. The machine disclosed in said prior patent is highly efficient and very satisfactory in general. An object of the present invention is to improve a machine of the type disclosed in said patent in a way which will make such machine even more efficient and satisfactory than it has been in the past, particularly when used for cutting stock having a tendency to curl.

A further object is the provision of what might be termed "disappearing" anti-curling deflectors or guides which will direct a curled sheet into proper position with relation to the cutting knife, and then will move to an out-of-the-way position during the making of the cut, so as not to interfere with the cutting operation or with the dropping of the severed sheet in the desired manner after it is cut.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

As explained in said Patent 2,126,478, it is the practice in making certain types of photographic reproductions of cards or other records to be copied, to photograph the successive cards or other records on successive portions of a long strip 21 (Fig. 2) of sensitized material, such as paper or, preferably, card stock. The successive reproductions are slightly spaced from each other, one reproduction occupying, for example, the space between the transverse lines 23 and 24 in Fig. 2 of the present drawings. In the small space (which may be subject to variation in width) between successive reproduction areas, and which constitutes a waste space, there are certain control points such as the perforations 22 punched in the sheet at the time of the photographing operation and bearing a definite relation to the transverse edges of one of the adjacent reproduction areas or useful areas.

Figure 2:
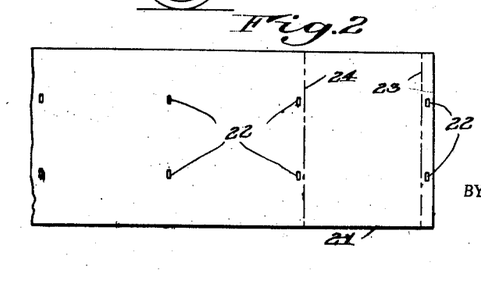
Fig. 2 is a view of a strip of stock to be cut by the machine, illustrating the position of the cuts with relation to each other and to predetermined control perforations in the strip.

After the photographic images on the strip of stock have been developed, fixed, and washed, or otherwise processed, the practice is to cut the strip along transverse lines, such as the dot-dash lines shown at 23 and 24 in Fig. 2, to subdivide the strip into alternate useful portions containing reproductions of the original matter to be reproduced, and waste portions in the form of relatively narrow strips containing the control holes 22, each waste portion being, for example, approximately of the width indicated between the line 23 and the extreme right hand edge of the strip shown in Fig. 2. This cutting of the processed strip 21 into alternate useful and waste portions is most conveniently accomplished by a cutting mechanism having two pairs of cutting knives, operating substantially simultaneously, so that one pair of knives will make a cut along the line 23 at substantially the same time that the other pair is making a cut along the line 24, thus cutting one waste area and one useful area from the end of the strip 21 at each conjoint operation of the two pairs of cutting knives. The machine disclosed in said prior patent performs this cutting operation with great efficiency and success.

The long strip of stock which is to be severed by the machine, frequently has a tendency to curl longitudinally, there being almost no appreciable tendency to curl laterally, however, because the strip is held laterally flat while wound on the various reels before and after processing. The advancing end of the strip, as it is fed through the cutting machine, sometimes tends to curl upwardly, and sometimes downwardly, depending on the character of the photographic emulsion, the character of the fibrous sheet or base to which the emulsion is applied, the details of the processing operation, and other factors. When the two pairs of knives are spaced relatively close to each other, for cutting relatively small card areas, a reasonable amount of curling, especially in an upward direction, is adequately overcome by a machine constructed as disclosed in said patent. But when the knives are adjusted to a wider spacing for cutting larger cards, if the strip of stock being fed through the machine has excessive upward curling characteristics, or if it curls a substantial amount in a downward direction, then difficulty is sometimes encountered in feeding the stock smoothly through the machine of said prior patent. The present improvements overcome such difficulty. By means of the movable or "disappearing" anti-curling guides of the present invention, the strip of stock may be fed smoothly through the machine even though the strip may have a tendency to curl excessively in either an upward or downward direction, and even when the pairs of knife blades are spaced relatively widely from each other, to cut cards of large size, yet the guides do not interfere with the movements of the cutting blades nor with the dropping of the cut card into a receiving container.

These anti-curling guides of the present invention are useful in connection with sheet cutting apparatus of many different forms, especially those forms in which various factors prevent the use of fixed guides. For the sake of a convenient and preferred illustrative example of the use of the present invention, and not as a limitation thereon, it will be described in connection with a cutting machine of the type disclosed in said prior Patent 2,126,478. Reference is made to said patent for a more detailed description of such machine, here described only in a brief outline in the course of which the respective parts will be designated by the same reference numerals used in said patent.

Figure 1:
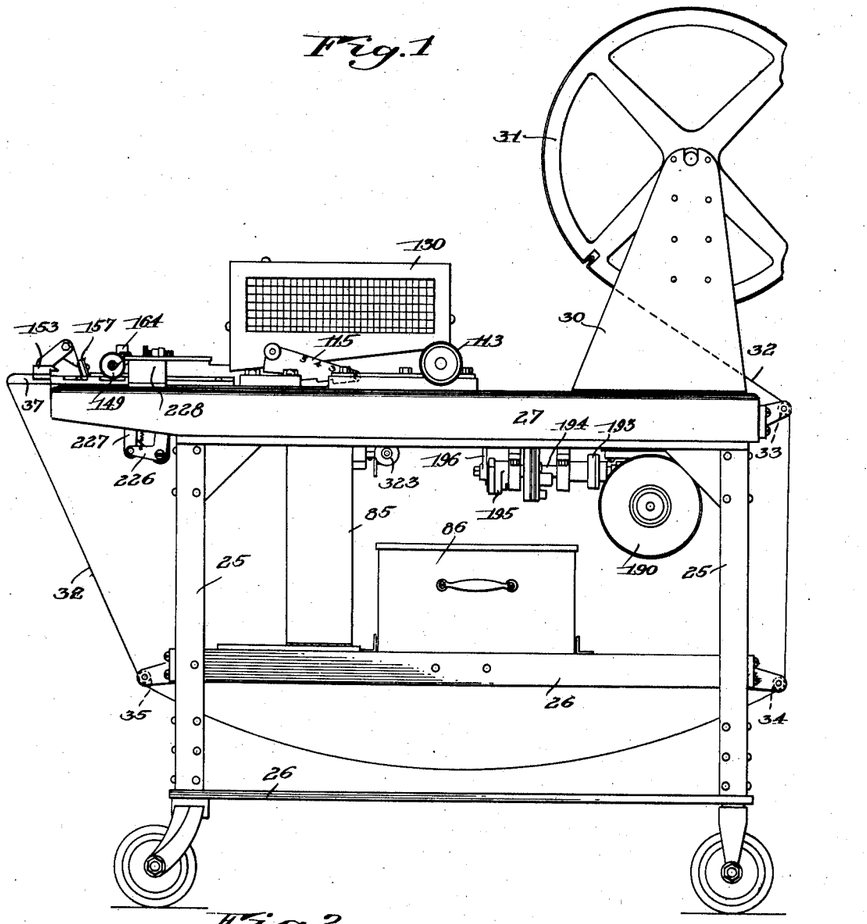
Fig. 1 is a side elevation of a machine in accordance with a preferred embodiment of the invention.

The machine comprises, for example, a wheeled carriage or framework (Fig. 1) having upright members 25, horizontal members 26, and a top 27 carrying standards 30 to support a reel 31 on which the strip of stock 32 is wound ready for cutting in this machine. The strip 32 as it is unwound passes over guide rollers 33, 34, and 35 to the opposite end of the table 27, where it bends around a rounded portion at the end of a plate 37 secured to the table 27, and thence extends forwardly over the top of the table and beneath a bridge piece 153 (Figs. 1 and 3) carrying a brake 157 to contact with the upper surface of the strip, and continues forwardly between lateral guides 145 adjustable to accommodate stock strips of different widths by turning the threaded adjusting shaft 148 by means of the knob 149. While moving between the lateral guides 145, the strip passes over the supporting plates 141 and 142 to a position cooperating with a slidable feeding carriage 163 manually moved by an operating bar 164 and carrying pivoted dogs 167 having points entering the control holes 22 in the stock strip. Beyond the farthest position of the feeding carriage is the first pair of cutting knives, or first "knife assembly," comprising a lower fixed knife blade 41 and an upper blade 42 mounted to slide in suitable guideways provided with spring pressed gibs in vertical standards 40 on opposite sides of the path of travel of the strip to be cut.

Spaced beyond the first knife assembly is the second knife assembly, comprising upright standards 60 in straddling relation to the path of travel of the strip to be cut, and mounted on a slide 61 adjustable toward and away from the first knife assembly, when certain clamping bolts have been loosened, by turning the knob 113 fixed to a shaft 110 journaled on the slide 61 and carrying pinions 111 meshing with racks 112 secured to the stationary framework. Proper spacing of the two knife assemblies at certain predetermined distances is assisted by the notched templet 115 pivoted to the carriage 61. Also mounted on this carriage is a cross bar 63 on which is mounted the lower knife blade 64 of this knife assembly, which blade has a vertical face 65 and a narrow flat upper edge 66. The upper knife blade 70 of this assembly is mounted in guideways (preferably with spring pressed gibs) in the standards 60, and carries, on its face remote from the first knife assembly, a holding element 90 (see also Fig. 8) mounted for limited upward and downward movement relative to the blade 70 and constantly urged downwardly by a spring 93.

To operate the knife blades to make a cut, the operator presses downwardly on a trip member 228 (Fig. 3) pivoted near one end on the pivots 229. The other end of the plate, when depressed, causes downward movement of a bracket 227 (Fig. 1) and, through connected parts 226, 222 (Fig. 3), 221, and 220, operates the usual trip member of a single-revolution clutch 193 mounted on a shaft 192 driven by reduction gearing 191 from an electric motor 190 which runs constantly when the machine is in operation. Tripping the clutch causes one revolution of the driven shaft 194 and of a crank 195 fixed thereto, and a connecting link 196 causes a single oscillation of a shaft 54 to which is fixed a narrow gear segment 53 (Fig. 4) in the vicinity of the first knife assembly and a relatively wide gear segment 79 in the vicinity of the second knife assembly.

Figure 3:
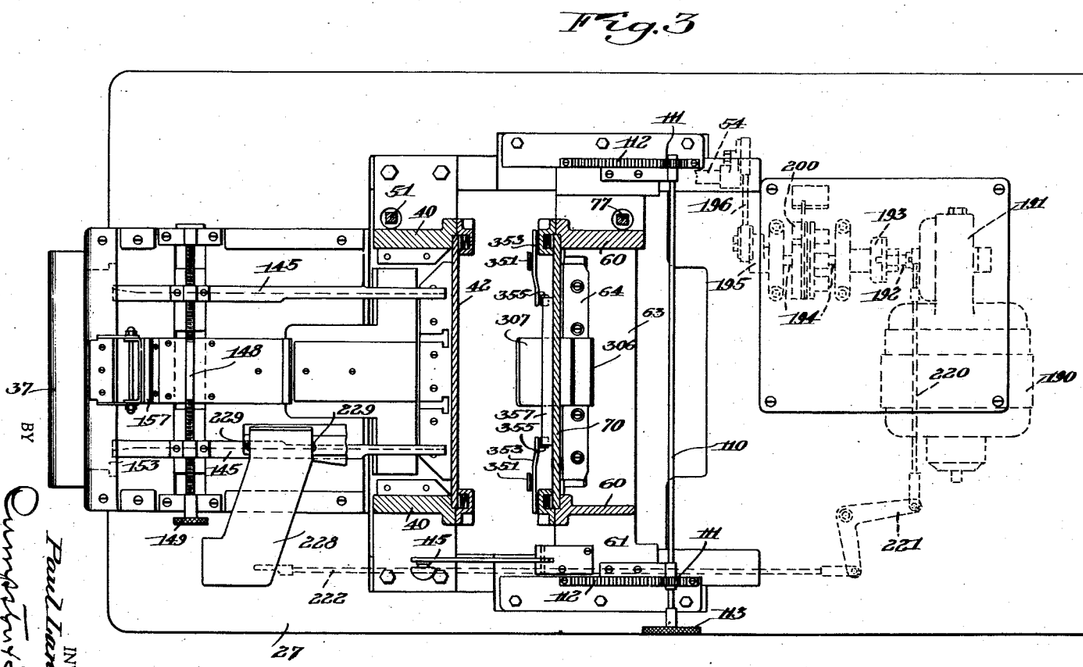
Fig. 3 is a plan of the machine shown in Fig. 1, with parts removed and parts shown in horizontal section.
Figure 6:
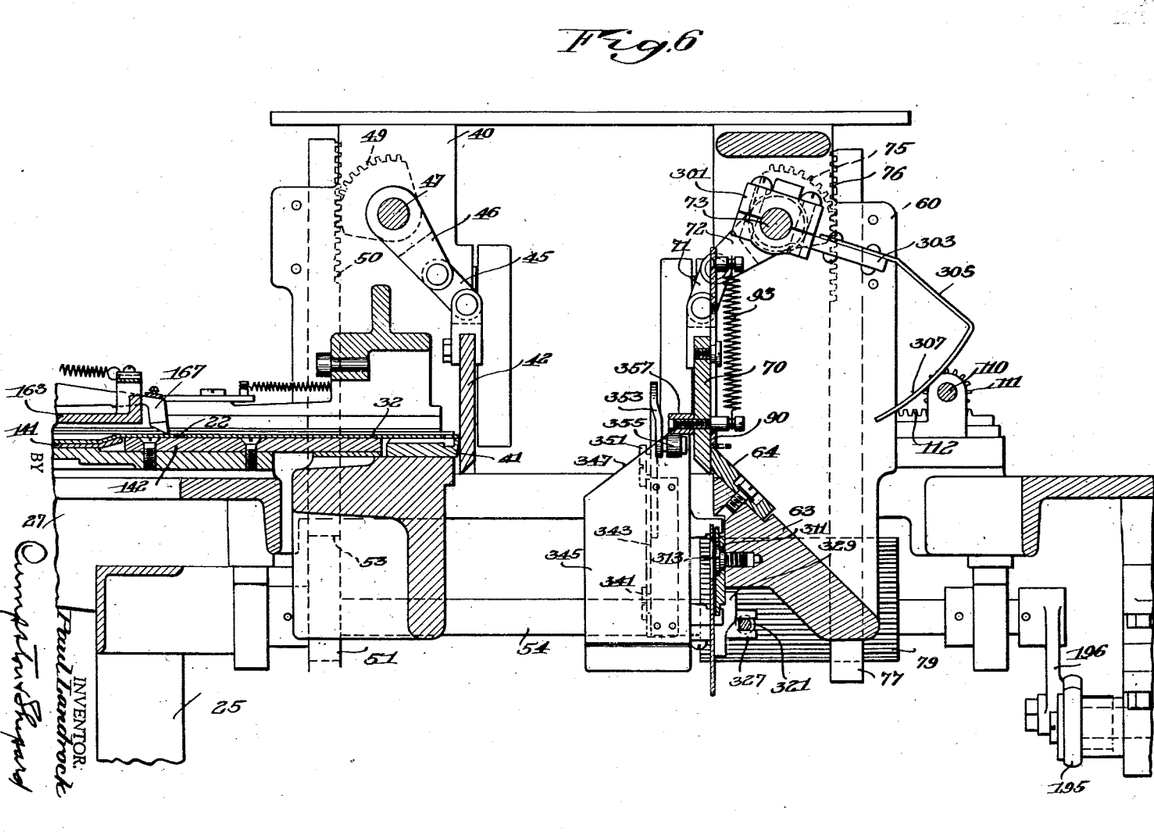
Fig. 6 is a view similar to Fig. 4 with the knives in closed position approximately at the completion of a downward cutting stroke.

The movable knife 42 of the first assembly is reciprocated by links 45 pivoted to arms 46 on a cross shaft 47 journaled in the side frame members 40 and carrying a gear segment 49 meshing with gear teeth 50 on one face of a rack bar 51 vertically movable in suitable guideways, another face of this rack bar having rack teeth meshing with the segment 53. The upper knife blade 70 of the second knife assembly is similarly driven by links 71 pivoted to arms 72 fixed to the cross shaft 73 journaled in the upright standards 60 and carrying a gear segment 75 meshing with rack teeth 76 on one face of a rack bar 77 vertically slidable in suitable guideways, another face of which bar carries rack teeth meshing with the wide gear segment 79 in any position to which the second knife assembly may be adjusted toward and away from the first knife assembly. During one complete oscillation of the shaft 54 caused by the single revolution of the crank 195 each time the clutch 193 is tripped, the upper knives 42 and 70 of both knife assemblies first come down from the uppermost positions shown in Fig. 4 to the lowermost positions shown in Fig. 6, and then retrace their steps, moving upwardly again to the position shown in Fig. 4, at which positions they always come to rest with the aid of certain stop mechanism or over-running-prevention mechanism indicated in general at 200 (Fig. 3). During the downward movement of the two knives 42 and 70, two cuts are made substantially simultaneously across the strip of material (as, for example, along the lines 23 and 24 of Fig. 2) and the severed card or useful area between the two cuts drops downwardly between the two knife assemblies and into a receiving container 85 (Fig. 1) while the narrow waste area formed from that portion of the stock strip projecting beyond the second knife assembly slides down the inclined surfaces of the members 64 and 63 into a waste receiving drawer 86. A guard of screening or grill work held in a suitable frame 130 (Figs. 1 and 4) surrounds the upper parts of the two knife assemblies to prevent accidental injury by the moving parts.

The parts thus far briefly mentioned may all be of the same construction disclosed in said Patent 2,126,478, reference to which is made for a more detailed description thereof. The foregoing parts, in themselves, do not constitute the present invention, but a knowledge of them is useful for a complete understanding of the background or setting of the present invention.

According to the present invention, the stationary anti-curling guides indicated at 101 and 103 in the drawings of said patent are eliminated, and in place of them there are employed movable or "disappearing" anti-curling guide means both above and below the normal horizontal plane of the sheet being cut.

The upper guide means, as seen in Figs. 4 to 7, comprises a split sleeve 301 rigidly clamped on the shaft 73 near the center thereof, and having a radial extension 303 to which is riveted or otherwise secured a plate 305 extending roughly radially for a distance and then terminating in an arcuate portion 307 substantially concentric with the center of rotation of the shaft 73. When the knives are open, in their normal position of rest, the guide member 307 lies in the position indicated in Figs. 4 and 5, slightly above the upper edge of the lower knife blade 64 of the second knife assembly. In this position, it acts as a deflector to cause downward deflection of the advancing edge of the strip of sheet material, if it has a tendency to curl upwardly as indicated in dotted lines in Fig. 4. When the shafts 47 and 73 are oscillated to cause downward cutting movement of the knife blades 42 and 70, the oscillation of the latter shaft carries the parts 305 and 307 with it, withdrawing the trailing edge of the arcuate plate 307 from between the two knife blades just in time to avoid the descending bottom edge of the holding member 90 on the upper blade 70. Upon completion of the cut and subsequent upward movement of the blade 70, the rotation of the shaft 73 in the reverse direction moves the plate 307 back into the space between the knife blades, ready to perform, if necessary, its downward deflecting function during the next forward advance of the strip of sheet material.

The lower deflectors, below the level of the sheet material, are of somewhat different construction. A cross bar 311 is secured to a vertical face of the member 63 by means of studs 313, the central one of which passes also through an abutment plate 315. The cross bar 311 constitutes a rail or guideway on which are slidably mounted two slides or carriages 317. These carriages, and the parts thereon, are reverse duplicates of each other (one being right hand and the other being left hand) so that a description of one will suffice for both. The carriages may be adjusted along the rail 311, closer to or farther from each other, by an adjusting screw 321 turned by a knob 323 and having right hand and left hand screw threaded portions engaging threaded openings through brackets 325 mounted on the slides or carriages 317. Between the right hand and left hand screw threaded portions of the screw 321 is a portion of reduced diameter which is embraced by a fork 327 (Figs. 9 and 12) secured to and extending rearwardly from a member 329 held to the rail 311 by screws 331 (Figs. 9 and 11) and to the stop plate 315 by screws 333, so that the forked portion 327 is firmly held in stationary position and prevents the screw 321 from moving longitudinally. The stop plate 315 limits the extent to which the two carriages 317 may be moved toward each other, to provide sufficient minimum spacing so that the moving parts on the two carriages will not interfere with each other.

Figure 4:
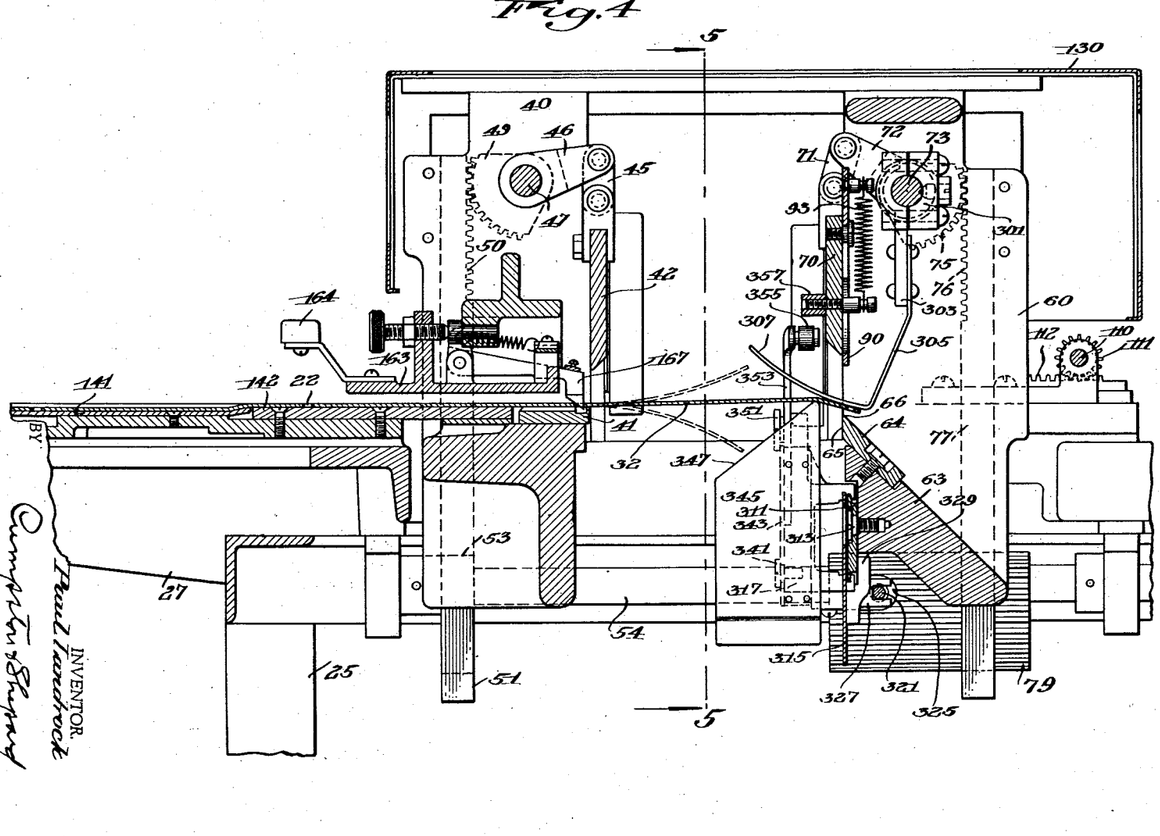
Fig. 4 is a vertical longitudinal section taken approximately centrally through the cutting knives and associated parts of the apparatus, with the knives in their open position.
Figure 5:
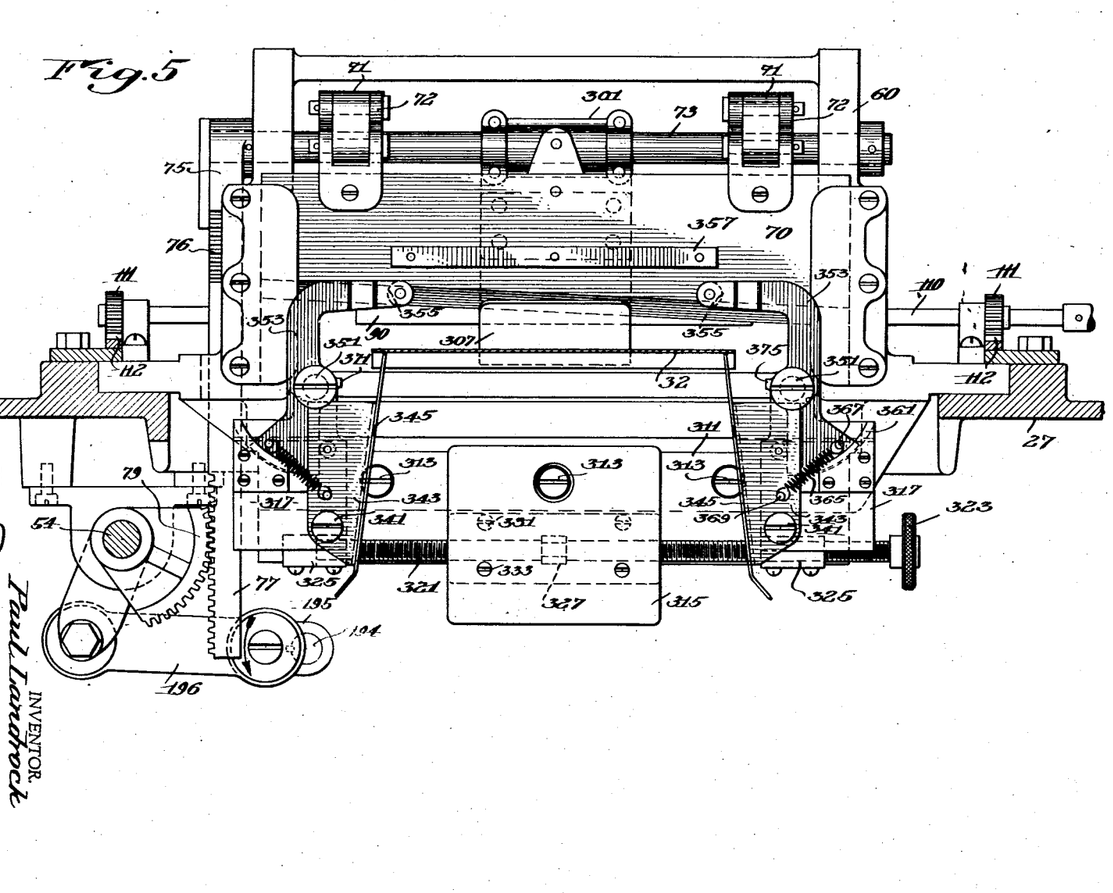
Fig. 5 is a vertical transverse section taken substantially on the line 5—5 of Fig. 4, illustrating the anti-curling guides in elevation, the associated knives still being in open position.
Figure 9:
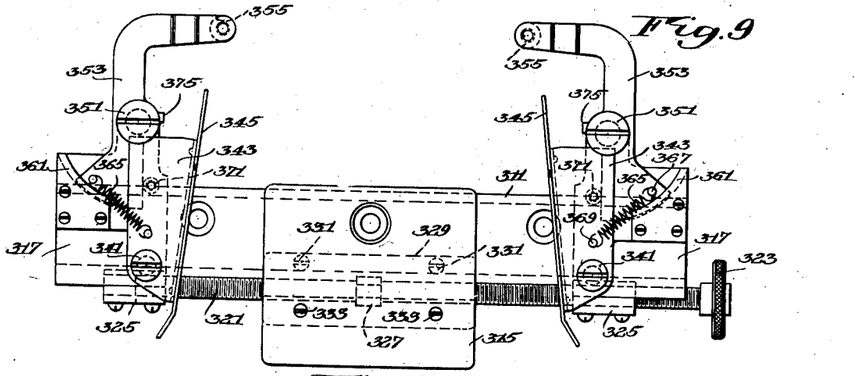
Fig. 9 is an elevational view of the lower anti-curling guides and associated operating and adjusting mechanism, with the parts in their normal effective position.
Figure 10:
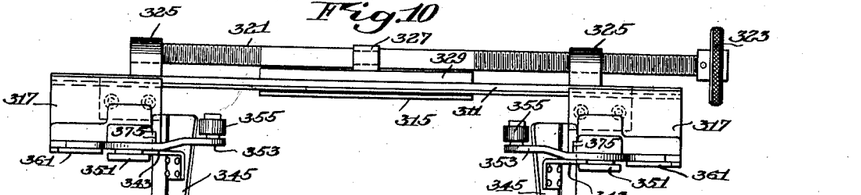
Fig. 10 is a top plan view thereof, with the parts in the same position.

Each carriage 317 has pivotally mounted on it, by means of the stud 341, a plate 343 swingable in a plane approximately parallel to the planes of operation of the movable knives 42 and 70, and carrying, at its edge closest to the center line of the strip of sheet material to be cut, a plate 345 of somewhat wing-shaped trapezoidal form, having an inclined upper edge 347 extending obliquely upwardly in the direction of travel of the sheet material, as best seen in Fig. 4. The rounded upper corner of each wing plate 345, when the plate is in its normal position of rest, lies slightly above and ahead of the upper edge 66 of the knife blade 64, and slightly below the adjacent part of the arcuate upper guide plate 307, as seen in Fig. 4. By turning the knob 323 and the adjusting screw 321, the carriages 317 and with them the wing plates 345 may be adjusted toward and away from each other for different widths of strips of sheet material to be cut, adjustment being made in each case so that the upper corners or tips of the wings 345 lie just inside the extreme lateral edges of the strip to be cut, as best seen in Fig. 5. These wings, in their normal positions of rest, are inclined outwardly away from each other in a downward direction, as seen in Figs. 5 and 9. In other words, the top corners of the two wings are closest to each other, and the spacing between the wings increases from the top edges downwardly.

For moving each wing 345 to withdraw it from beneath the strip to be cut, during the actual cutting operation, each carriage 317 is provided with a stud 351 on which is pivotally mounted an arm 353 having a main portion extending approximately vertically both above and below the pivotal stud 351 (when in normal position of rest) and a laterally or horizontally extending portion at the upper end of the vertical portion, carrying at its extremity a roller 355 underlying a horizontal bar 357 fixed to the adjacent face of the knife blade 70.

Figures 7, 8:
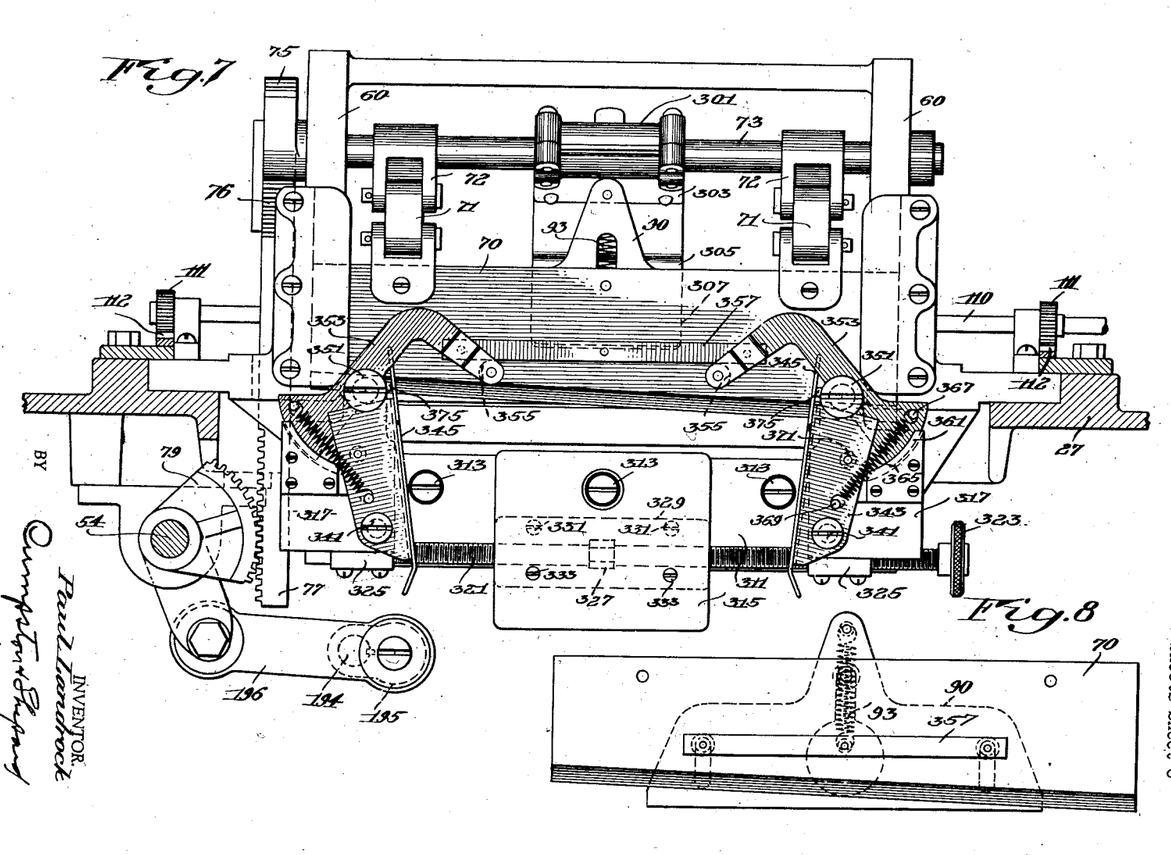
Fig. 7 is a view similar to Fig. 5 with the knives and associated parts in the same positions illustrated in Fig. 6, the anti-curling guides being now in an ineffective or out-of-the-way position.
Fig. 8 is a face view of one of the knife blades and associated parts mounted thereon.
Figures 11, 13:
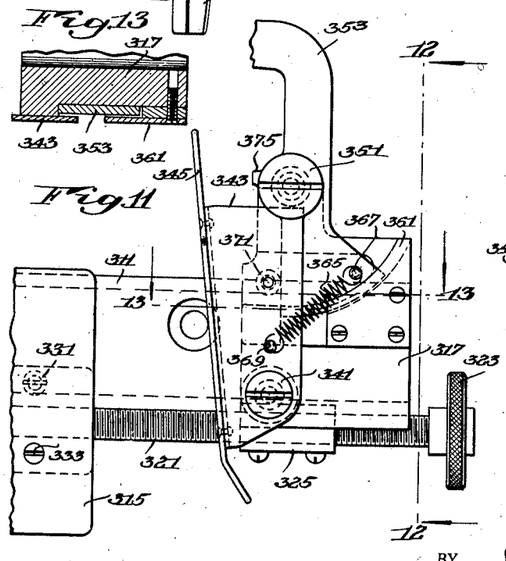
Fig. 11 is an enlarged elevational view of part of the mechanism near the lower right hand corner of Fig. 9.
Fig. 13 is a horizontal section taken substantially on the line 13—13 of Fig. 11.
Figure 12:
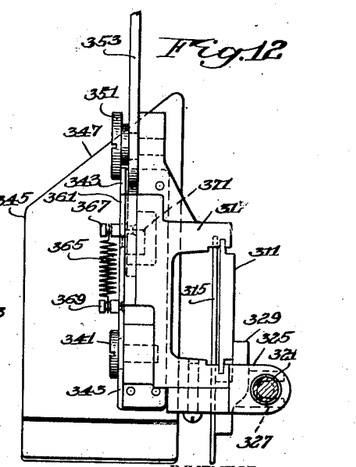
Fig. 12 is a vertical section taken substantially on the line 12—12 of Fig. 11, showing most of the parts in elevation.

The lower portion of the arm 353, below the pivot 351, terminates in an arcuate lower end concentric with the pivot, as seen best in Fig. 11, and a plate 361 fixed to the bracket 317 overlaps this arcuate lower end of the lever as best seen in Fig. 13, to guide it and keep it from wobbling out of its own plane. A coiled tension spring 365 is hooked at one end over a stud 367 near the lower end of the lever 353, and at the other end over a stud 369 on the plate 343 which carries the wing 345. This spring constantly tends to turn the lever 353 and the plate 343 in corresponding directions about their respective pivots 351 and 341 until the vertical radial edge of the lower part of the lever 353 comes into contact with a shoulder on the bracket 317 (see Fig. 13) and until a small roller 371 mounted on the rear face of the plate 343 abuts against the above mentioned vertical radial edge of the lever 343, as seen in Fig. 11. When the knife blade 70 comes down to make a cut, however, the descending bar 357, pressing on the roller 355 of the lever 353, turns the latter against the tension of the spring 365, and as the above mentioned radial edge of the lever moves in an outward direction (that is, away from the center line of the strip being cut) the plate 343 and wing 345 turn around the pivot 341, the roller 371 following along the now-receding edge of the lever 353 until the upper part of the wing 345 comes in contact with an abutment stop 375 formed on the carriage 317, which prevents further motion of the wing 345 and plate 343 although the lever 353 may turn further as the knife blade continues its descent. The position of these parts at the bottom of the downward movement of the knife blade is shown in Fig. 7.

Both the upper anti-curling guide means 307 and the lower anti-curling guide means 345, being mounted directly on the second knife assembly, move bodily therewith when the second knife assembly is adjusted toward or away from the first knife assembly (by turning the shaft 110) in order to vary the width of the card being cut from the strip of stock, so separate adjustment of the anti-curling guide means is not necessary when an adjustment of the distance between cuts is made. When adjustment of the wings 345 is to be made for a different width of strip of stock to be cut, such adjustment is easily and quickly made by turning the screw 321 by means of the knob 323 to position the upper corners of the wings 345 just inside the lateral edges of the strip of stock to be cut, and another width adjustment is made by turning the screw 148 (Fig. 3) by means of the knob 149, to move the lateral guides 145 to the proper spacing to accommodate the new width of strip.

In operation, after the proper adjustments have been made for the width of the strip to be cut and for the proper spacing between cuts, the motor 190 is set into continuous operation and the operator feeds the strip of sheet material forwardly step by step by manually reciprocating the feeding bar 164 of the feeding carriage 163. As fully described in said Patent No. 2,126,478, the dogs 167 enter the control holes 22 in the strip and, at each forward movement of the feeding carriage, cause the advance end of the strip to move forwardly beyond the first knife assembly 41, 42 and into cooperative relation to the second knife assembly 64, 70. If the advancing end of the strip to be cut has a tendency to curl upwardly as indicated by certain of the dotted lines in Fig. 4, the end will be deflected downwardly into proper position by the upper guide means 307. If the advancing end has a tendency to curl downwardly, as shown by other dotted lines in Fig. 4, such advancing end will contact with the inclined upper edges 347 of the wings 345 and will be deflected upwardly thereby, riding up the inclined edges and across the rounded top corners of the wings. In either event, at the completion of the forward motion of the feeding carriage the parts will be substantially in the position shown in Figs. 4 and 5 of the present drawings.

The operator then depresses the trip member 228, which trips the single revolution clutch 193 to cause the motor 199 to produce a single oscillation of the shaft 54, thereby causing both of the upper knife blades 42 and 70 to move downwardly to make substantially simultaneous transverse cuts in the sheet material, and then to move upwardly again to their initial positions of rest.

As the shaft 73 turns to cause the knife blade 70 to move downwardly, the upper deflector member 307, mounted directly on this shaft, turns with it and is withdrawn from beneath the upper knife blade as the latter moves downwardly, but it holds the strip of stock in downwardly deflected position, against any upward curling tendency, until shortly before the holding member 90 comes down on the top of the strip of stock. At the same time that the rotation of the shaft 73 is withdrawing the upper deflector 307, the downward movement of the knife blade 70 causes the bar 357 mounted thereon to contact with the rollers 355 on the two levers 353, swinging the upper ends of both levers inwardly and downwardly about their pivots 351, thus moving the lower ends of both levers outwardly away from each other, which causes outward swinging movement of the upper ends of the two plates 343 and wings 345 from the initial or normal rest positions shown in Fig. 5 to the ineffective positions shown in Fig. 7. Thus just before the strip of stock is clamped by the holding member 90, the upper ends of the wing members 345 swing outwardly away from each other far enough to pass the lateral edges of the strip of stock so that the wings are out of actual contact with the stock at the instant of making the cut. As soon as the two transverse cuts made by the knife blades 42 and 70 are completed, the supporting wings 345 now being out of the way, the cut card is free to drop downwardly into the receptacle 85, and as soon as the knife blade 70 subsequently moves upwardly far enough to release the holding member 90 from the top edge of the member 64, the narrow waste strip which was cut from the extreme end of the stock is released and slides down the inclined surface 63 and into the receptacle 86. The operator may now reciprocate the feeding carriage 163 once more, advancing the strip of stock ready for the next cutting operation.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:

1. A sheet guiding mechanism for a sheet cutting apparatus including a pair of knife elements movable relatively to each other to effect a cutting operation, said mechanism comprising a deflecting guide member projecting through the space between said knife elements when they are in separated position, for guiding an advancing edge of a sheet to be cut to assist the entry of said edge into said space, and means for withdrawing said guide member from said space concurrently with relative movement of said knife elements toward each other.

2. A sheet guiding mechanism for a sheet cutting apparatus including a pair of knife elements movable relatively to each other to effect a cutting operation, said mechanism comprising a deflecting guide member in advance of said knife elements for supporting a drooping advancing edge of a sheet to be cut and deflecting it upwardly to assist entry of said edge into the space between said knife elements when they are in separated position, and means for moving said guide member to a non-supporting relation to said sheet concurrently with relative movement of said knife elements toward each other.

3. A sheet guiding mechanism for a sheet cutting apparatus, including a pair of knife elements movable relatively to each other from an open position to a closed position to effect a cutting operation, said mechanism comprising a sheet supporting member adjacent said knife elements and mounted for lateral movement from a supporting position underlying a sheet to an ineffective position, and means operating in timed relation to the relative movements of said knife elements for moving said supporting member from one of its said positions to the other.

4. A sheet guiding mechanism for a sheet cutting apparatus including a pair of knife elements movable relatively to each other from an open position to a closed position to effect a cutting operation, said mechanism comprising a sheet supporting member adjacent said knife elements and mounted for lateral movement from a supporting position underlying a sheet to an ineffective position, an upper deflecting guide member mounted for movement from an effective position overlying a sheet to an ineffective position, and means operating in timed relation to the relative movements of said knife elements for moving said supporting member from one of its said positions to the other and for concomitantly moving said upper guide member from one of its said positions to the other.

5. A construction as described in claim 4, in which said operating means moves both said supporting member and said upper guide member from their effective positions to their ineffective positions upon relative movement of said knife elements to closed position and returns both of said members to their effective positions upon return of said knife elements to open position.

6. A sheet guiding mechanism for a sheet cutting apparatus including a pair of cooperating knife elements one of which is movable relatively to the other from an open position to a closed position to make a cut, said mechanism comprising a sheet guide member mounted for oscillation through a path of travel passing through the space between said knife elements when they are in open position, and operating mechanism for moving the movable knife element to closed position and concomitantly shifting said guide member in one direction to withdraw it from the space between said knife elements and for moving the movable knife element to open position and concomitantly shifting said guide member in the opposite direction to insert it through the space between said knife elements.

7. A sheet guiding mechanism for a sheet cutting apparatus including a pair of cooperating knife elements one of which is movable relatively to the other from an open position to a closed position to make a cut, said mechanism comprising an oscillatory shaft operatively connected to the movable one of said knife elements to move the same between open and closed positions, and a sheet guide members mounted on and oscillating bodily with said shaft through a path of travel which carries a portion of said guide member through the space between said knife elements when said shaft is turned in a direction to open the knife elements and which withdraws said portion from said space when said shaft is turned in the opposite direction to close the knife elements.

8. A construction as described in claim 7, in which said portion of said sheet guide member is of approximately arcuate shape approximately concentric with the axis of rotation of said shaft.

9. A sheet guiding mechanism for a sheet cutting apparatus including a pair of cooperating knife elements one of which is movable relatively to the other from an open position to a closed position to make a cut, said mechanism comprising a sheet guide member mounted for movement between an effective position underlying the sheet to be cut and an ineffective position offset laterally from the sheet, a lever operatively connected to said guide member, and an abutment portion on the movable knife element for contacting with said lever to move the lever to shift said guide member from effective position to ineffective position when said movable knife element moves to closed position to make a cut.

10. A sheet guiding mechanism for a sheet cutting apparatus including a pair of cooperating knife elements one of which is movable relatively to the other from an open position to a closed position to make a cut, said mechanism comprising a sheet guide member mounted for movement between an effective position underlying the sheet to be cut and an ineffective position offset laterally from the sheet, a lever mounted for oscillation approximately in a plane transverse to the sheet to be cut, spring means tending to hold said lever in a position resisting movement of said guide member away from effective position and tending to hold said guide member against said lever, and an abutment portion on the movable knife element for contacting with said lever as said knife element moves from open toward closed position, thereby moving said lever and causing movement of said guide member from effective toward ineffective position.

11. A sheet guiding mechanism for a sheet cutting apparatus including a pair of cooperating knife elements one of which is movable relatively to the other from an open position to a closed position to make a cut transversely across a strip of sheet material, said mechanism comprising a slide movable in a direction transversely across said strip, a sheet guiding member having a sheet contacting portion mounted on said slide for movement in a direction transversely across said strip, means for adjusting the position of said slide to locate said guiding member in such position that said sheet contacting portion in one part of its range of movement will be alined with the strip of sheet material and in another part of its range of movement will be laterally offset beyond the edge of said strip, and operating means for moving said sheet contacting portion from alined position to offset position concomitantly with movement of the movable knife element from open position to closed position.

12. A sheet guiding mechanism for a sheet cutting apparatus including a pair of cooperating knife elements one of which is movable relatively to the other from an open position to a closed position to make a cut transversely across a strip of sheet material, said mechanism comprising a slide movable in a direction transversely across said strip, a sheet guiding member having a sheet contacting portion mounted on said slide for movement in a direction transversely across said strip, means for adjusting the position of said slide to locate said guiding member in such position that said sheet contacting portion in one part of its range of movement will be alined with the strip of sheet material and in another part of its range of movement will be laterally offset beyond the edge of said strip, an operating lever movably mounted on said slide for causing movement of said guiding member, and an elongated abutment portion on the movable knife element for contacting with said operating lever in any position to which said slide is adjusted in a direction transversely of the strip of sheet material, to cause movement of said operating lever to move said sheet contacting portion from alined position to offset position concomitantly with movement of the movable knife element from open position to closed position.

13. A sheet guiding mechanism for a sheet cutting apparatus including a pair of cooperating knife elements one of which is movable relatively to the other from an open position to a closed position to make a cut transversely across a strip of sheet materal, said mechanism comprising a pair of sheet guiding members adjacent opposite lateral edges of said strip of sheet material and having sheet contacting portions mounted for a movement toward each other to positions underlying the lateral edges of said strip and for movement away from each other to positions offset laterally beyond the edges of said strip, and operating mechanism for moving said sheet contacting portions of said guiding members away from each other to said offset positions concurrently with movement of the movable knife element to closed position to make a cut and for restoring said contacting portions to said underlying positions concurrently with return of the movable knife element to open position.

14. In sheet cutting apparatus of the type including means for severing a strip of sheet material along one transverse line and means for concomitantly severing said strip along another transverse line spaced from the first line, the space between the two lines of severance being sufficiently free from supporting means so that the severed sheet may drop downwardly by gravity, the combination of strip guiding means mounted for movement laterally of the strip between an ineffective position laterally offset beyond the edge of the strip and an effective position beneath the strip between said two transverse severance lines to guide the advancing edge of the strip when it is fed forwardly across said space to a new cutting position, and mechanism operating in timed relation to the operation of said severing means for moving said guiding means to said ineffective position while cuts are being made by said severing means and thereafter moving said guiding means to said effective position ready for guiding the next feeding movement of the strip.

15. In sheet cutting apparatus of the type including means for severing a strip of sheet material along one transverse line and means for concomitantly severing said strip along another transverse line spaced from the first line, the space between the two lines of severance being sufficiently free from supporting means so that the severed sheet may drop downwardly by gravity, the combination of a pair of lower strip guides having inclined guiding surfaces movable from ineffective positions spaced laterally beyond the edges of the strip to effective positions in the path of travel of a downwardly displaced advancing edge of the strip when it is fed forwardly across said space to deflect said advancing edge upwardly into cooperative relation to the second severing means, an upper strip guide having an inclined surface movable from an ineffective position to an effective position in the path of travel of an upwardly displaced advancing edge of the strip when it is fed forwardly across said space to deflect it downwardly into cooperative relation to the second severing means, and operating mechanism for moving said lower and upper strip guides to their respective inoperative positions while cuts are being made by said severing means and thereafter moving said guides to their effective positions ready to guide the advancing edge of the strip during the next feeding movement thereof.

PAUL LANDROCK.